Patented Aug. 26, 1952

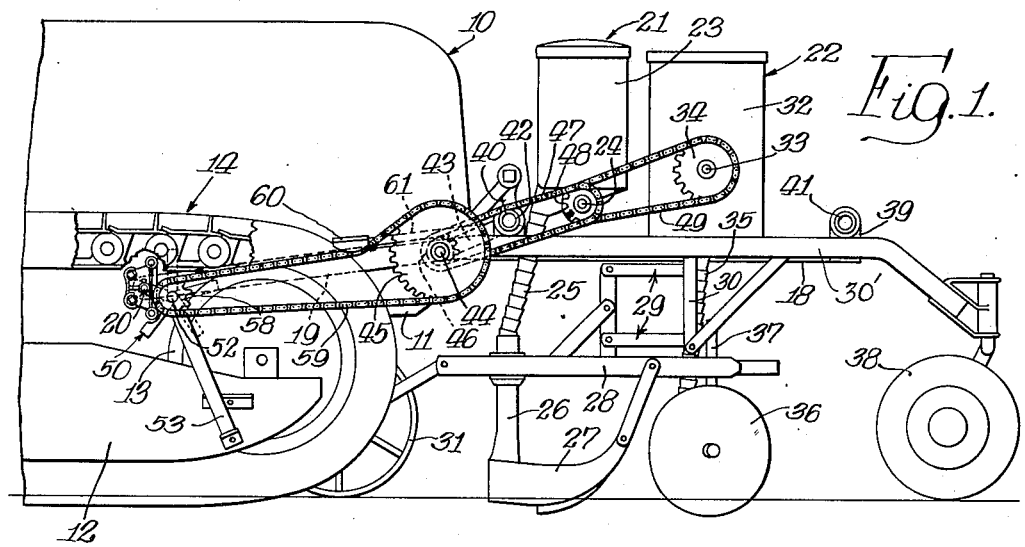
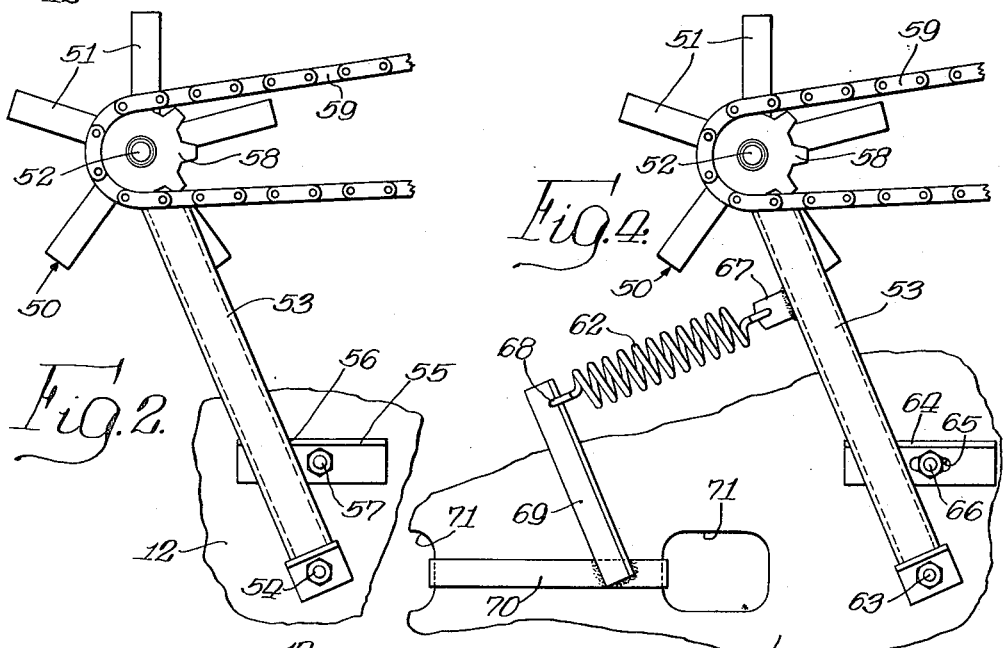
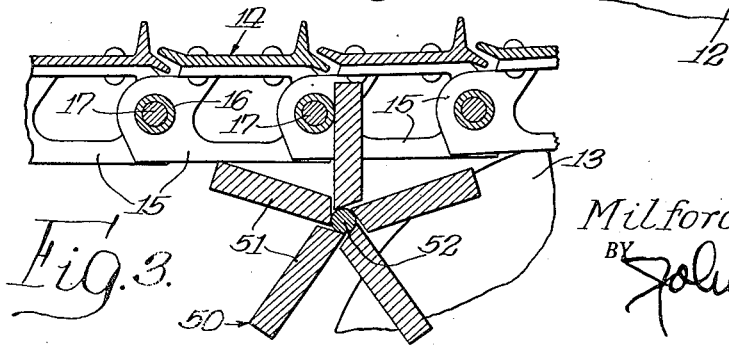

2,608,259

UNITED STATES PATENT OFFICE 2,608,259

TRACTOR DRIVE FOR IMPLEMENTS

Milford D. Stewart, South Bend, Ind., assignor to The Oliver Corporation, a corporation of Delaware Application January 24, 1950, Serial No. 140,286

4 Claims. (Cl. 180—14)

The present invention relates generally to tractors, but more particularly to a novel means for operatively driving movable elements of an implement attached to or drawn by the tractor by the traction means of the tractor so as to coordinate or synchronize the speed or distance of travel of the traction means with that of the movable elements of the implement.

One of the primary objects of the present invention is to provide a novel and improved type of drive for the movable elements of an implement attached to or operatively propelled by a crawler type tractor in which the movable elements of the implement are efficiently and operatively timed and driven by one of the endless tracks of the crawler tractor regardless of the flexing of the implement frame with respect to the tractor frame or the undulating movement of the track frame with respect to the tractor frame in traveling over uneven ground.

A further object of the invention is to provide a novel and improved type of drive for driving the movable elements of an implement attached to or operatively associated with a crawler type tractor in which the implement elements are driven directly from one of the endless tracks of the tractor with the axis of the drive wheel which engages the endless track located in substantial alignment with the transverse axis or pivot of the implement frame forming the pivotal connection between the tractor frame and the implement frame.

These and other objects are accomplished by providing a construction and an arrangement of the various parts in the manner hereinafter described and particularly pointed out in the appended claims.

Referring to the drawings:

Fig. 1 is a fragmentary side elevational view of a conventional crawler type tractor and a similar fragmentary view of an implement attached thereto embodying my novel drive mechanisms;

Fig. 2 is an enlarged fragmentary side elevational view of the driving wheel and supporting arm therefor;

Fig. 3 is an enlarged fragmentary cross sectional view showing the manner in which the arms of the driving wheel are adapted to engage the sleeve portions of the links of the endless track; and Fig. 4 is an enlarged fragmentary side elevational view of a modified form in which the tension of the drive chain is operatively controlled by a spring.

In illustrating the preferred embodiment of my invention, I have shown the same in connection with a conventional form of crawler type tractor, a fragmentary portion of which is shown in the drawings and generally designated by the reference character 10. The tractor in this instance, comprises the usual longitudinally extending main frame 11 on which is mounted the usual motive force or engine (not shown). Flexibly connected to the rear axle structure of the main frame 11 in a manner well understood in the art, are the usual track frames 12. Journaled in the forward end of the track frame 12 are the customary idler rollers or wheels 13. Trained about the main drive wheel sprocket (not shown) and the front idler roller 13 is the usual endless track, generally indicated by the reference character 14. The track 14 is made up of a series of links 15 which, in turn, are provided with transverse bearing or sleeve portions 16, through which pins 17 are inserted for pivotally connecting the adjacent links together in the manner well understood in the art. The construction thus far described is a conventional form of crawler type tractor.

For the purpose of illustration, I have shown a planting mechanism as the attached implement. It will, of course, be understood that other types of implements, other than that shown, may be associated with or attached to the tractor in which my improved drive would be especially adapted. The implement in the illustration is mounted forwardly of the tractor and comprises longitudinally extending and laterally spaced apart implement supporting main frame members 18. These implement supporting frame members 18 extend rearwardly and have their rear portions extending slightly downwardly as shown at 19, with these portions lying contiguously to the opposite sides of the tractor frame and their rear ends pivotally attached, as shown at 20, to the opposite sides of the tractor frame. In this connection it will be noted that the implement supporting frame is pivotally connected at a point substantially in the center of the tractor frame or at that point of the tractor construction where the movement of the tractor frame is reduced to a minimum as a result of the galloping or undulation movement of the track frame going over uneven ground. The implement in this instance may comprise one or more detachable planting units or mechanisms, generally indicated by the reference character 21 and also may include a cooperating fertilizing attachment, generally indicated by the reference character 22. When more than one of these units are employed, they may be adjusted or spaced laterally from one another on transversely extending beams or pipes for the spacing of row crops in the manner hereinafter described. The planting mechanism in this instance comprises, briefly, the usual seed can or hopper 23 which has located in the bottom, the usual seeding mechanism (not shown) driven by a transverse shaft 24 journaled in suitable bearings supported on the unit frame members 30'. The seed is discharged from the planting mechanism and hopper 23 through a flexible tube 25, the discharge end of which is connected to a conduit 26 of a furrow opener 27. The opener or shoe 27 and the seed conduit 26 are secured to the usual longitudinally extending tool beam 28 which, in turn, is pivotally connected by a parallel link arrangement, generally indicated by the reference character 29. The parallel link arrangement is pivotally connected to depending arms 30 (only one of which is shown) which have their upper ends secured to longitudinally extending and spaced apart planter frame members 30' of the implement. Pivotally connected to the rear end of the beam 28 is the usual cover wheel 31.

The fertilizing attachment includes briefly, a hopper container 32 suitably supported on the implement frame members 30' which is provided with the usual fertilizing feeding or dispensing mechanism (not shown) within the container and operatively driven by a transverse shaft 33. The shaft 33 is journaled in suitable bearings (not shown) mounted on the frame members 30' and is provided with a sprocket wheel 34 secured to the outer end thereof. The fertilizer in the container 32 is discharged from the container through a flexible tube 35 which has its discharge end positioned adjacent the rear end of the disk 36. The disk 36 is positioned forwardly of the furrow opener 27 and is journaled on the lower end of the axle bracket 37 which, in turn, is secured to the forward end of the tool beam 28. The forward end of the implement supporting frame 18 is mounted on or supported by one or more caster wheels, generally indicated by the reference character 38. Secured to the top edges of the implement frame members 18 by means of front and rear clamp brackets 39 and 40 are front and rear transverse beams or pipes 41 and 42 respectively which are adapted to detachably supported planting units or frames 30' in adjustable spaced relation with respect to one another, similar to the manner in which the cultivating units are adjustable in the co-pending application of H. E. Altgelt, Serial No. 752,673, filed June 5, 1947. For more detailed information with respect to this particular construction, reference to this co-pending application may be had. Secured to the bracket 40 and an additional bracket (not shown) secured to the pipe 42, are rearwardly extending arms 43. Secured to the rear end of these arms 43 are bearings (not shown) in which a transverse shaft 44 is journaled. Secured to the outer end of the shaft 44 is a sprocket wheel 45. Secured adjacent the inner end of the shaft 44 is a second sprocket wheel 46. The second sprocket wheel 46 is geared by means of a chain 47 to a sprocket wheel 48 which, in turn, is secured to the outer end of the shaft 24 of the seed planting mechanism 21. Secured to the shaft 24 inwardly of the sprocket wheel 48 is a second sprocket wheel (not shown) which is geared by means of a chain 49 to the sprocket wheel 34 for driving the fertilizing mechanism 22.

My novel mechanism for operatively driving the movable elements of the implement attached to or associated with the tractor by the traction means of the tractor will next be described. This novel means includes a drive wheel, generally indicated by the reference character 50 in the form of five radially projecting arms 51 which are welded to or otherwise secured to a shaft 52. The shaft 52 is journaled in suitable bearings in the upper end of an arm or pipe 53 which has its lower end secured to the track frame 12 by means of a bolt 54. An intermediate portion of the pipe 53 is welded to an angle bracket 55, as shown at 56. The angle bracket 56 is secured to the track frame 12 by means of a bolt 57. Secured to the outer end of the shaft 52 is a sprocket wheel 58 which, in turn, is geared to and drives the sprocket wheel 45 by a chain 59. The chain 59 is provided with a chain tightner 60 which is secured to the rear end of the arm 61. The arm 61 is secured to the bracket 43.

From the above description it will be noted that the axis of the drive wheel 50 is positioned with respect to the track 14 so that the radially projecting arms 51 thereof successively engage the sleeves or barrel portions 16 of the successive links 15 of the track, as clearly shown in Figs. 1 and 3 of the drawings, to operatively drive the operative elements for planting and fertilizing mechanism of the implement associated with and connected to the tractor. It will also be noted that the axis of the drive wheel 50 is located in substantial transverse alignment with the pivotal axis 20 of the implement frame with the tractor frame so that there is a minimum displacement of the drive sprocket 45 with respect to the drive wheel 50.

In the modified form shown in Fig. 4 of the drawings, the belt tightner 60 for the chain 59 is dispensed with and the chain is kept taut by means of a spring 62. In this modified form, the lower end of the pipe 53 is pivoted on a bolt 63 to the track frame 12 and the forward movement of the pipe 53 is limited by a stop angle 64 which has a slot 65 therein for adjustably securing the stop to the track frame 12 by means of a bolt 66. One end of the spring is connected to an apertured ear 67 secured to one side of the arm 53 and the other end of the spring is connected, as shown at 68, to an angle member 69. The lower end of the angle member 69 is secured by welding to a horizontal bracket 70 which, in turn, has its opposite ends suitably secured to spaced apart openings 71 in the track frame 12.

Obviously in this modified form, the action of the spring 62 will constantly keep the chain 59 taut for any flexing in the drive mechanism caused by uneven or undulated travel of the tractor or implement by reason of traveling over rough terrain.

Summarizing the advantages and important features of operation of my improved driving mechanism, it will immediately become obvious that by driving the movable elements of an implement attached to or associated with the tractor, from a traction element of the tractor, the speed and distance of travel over the ground by the tractor is timed or synchronized with the movable parts of the implement so that in the case of a planting mechanism, the proper spacing of the seeds can be accurately accomplished so as to result in the alignment of the rows for proper cultivation so essential in the planting of row crops. It will further be observed that by positioning the drive wheel, or rather its axis, on the track frame in a position in substantial alignment with the pivotal point of suspension between the implement frame and the tractor frame, the displacement of the drive chain which operatively drives the movable elements of the implement is reduced to a minimum and yet, at the same time, permits both the track frame of the tractor and the implement to sufficiently flex or move with respect to one another without interfering with their normal function and operation. It will also be noted that by employing radial arms on the drive wheel so as to engage the sleeve or barrel portions of the successive links of the endless track, the opportunity for the accumulation of mud and dirt between these driving parts is practically eliminated or reduced to a minimum.

While in the above specification I have described one preferred embodiment and one modification of my invention, it will, of course, be understood that the same is capable of further modification and is especially adapted for the driving of other implement parts of various implements attached to or associated with the tractor without departing from the spirit and scope of the invention as expressed in the appended claims.

What I claim as my invention and desire to secure by Letters Patent is:

1. The combination with a crawler type tractor having a main frame, track frames flexibly connected to said main frame, endless tracks trained about said track frames, of an implement having a frame and flexibly connected directly to the main frame of said tractor, movable elements carried by said implement, a drive wheel carried by one of said track frames and engageable with the endless track thereof, a sprocket wheel operatively connected to said movable elements, and means including a drive chain for operatively driving said sprocket wheel from said drive wheel.

2. The combination with a crawler type tractor having a main frame, track frames flexibly connected to said main frame, endless tracks trained about said track frames, of an implement having a frame pivoted directly to the main frame of the tractor in the approximate center thereof, movable elements mounted on said implement frame, a drive wheel carried by one of said track frames and engageable with one of said endless tracks, the axis of said drive wheel being located in substantial alignment with the pivot of the implement frame and tractor frame, and means including a sprocket wheel and chain drive for operatively driving said movable elements from said drive wheel.

3. A structure specified in claim 2 in combination with a chain tightener carried by said implement frame and engageable with said chain for taking up the slack in the drive chain.

4. The combination with a crawler type tractor having a main frame, track frames flexibly connected to said main frame, endless tracks trained about said track frames, of an implement having a frame pivoted to the main frame of said tractor, movable elements mounted on said implement frame, an arm pivoted to one of said track frames, a drive wheel journaled on said arm and engageable with one of said endless tracks for driving said drive wheel, a sprocket wheel in axial alignment with and driven by said drive wheel, a second sprocket wheel operatively related to said movable elements, a drive chain trained about said sprocket wheels, and a tension spring having one end connected to said arm and the other end connected to said track frame for maintaining said drive chain taut.

MILFORD D. STEWART.

REFERENCES CITED

The following references are of record in the file of this patent:

UNITED STATES PATENTS

| Number | Name | Date |
|---|---|---|
| 875,539 | Little | Dec. 31, 1907 |
| 944,897 | Morris | Dec. 28, 1909 |
| 1,288,241 | Simrall | Dec. 17, 1918 |
| 1,316,625 | Lumm | Sept. 23, 1919 |
| 1,918,172 | Barron et al. | July 11, 1933 |
| 2,238,346 | Sorensen | Apr. 15, 1941 |
| 2,253,706 | Hipple | Aug. 26, 1941 |